United States Patent [19]
Phillips et al.

[11] Patent Number: 5,223,974
[45] Date of Patent: Jun. 29, 1993

[54] COLLIMATOR FOR BINOCULAR VIEWING SYSTEM

[75] Inventors: Earle N. Phillips, Roanoke, Va.; Richard E. Forkey, Westminster; Brian E. Volk, Holden, both of Mass.

[73] Assignee: ITT Corporation, New York, N.Y.

[21] Appl. No.: 915,069

[22] Filed: Jul. 16, 1992

Related U.S. Application Data

[62] Division of Ser. No. 811,836, Dec. 20, 1991, Pat. No. 5,157,553.

[51] Int. Cl.$^5$ .................... G02B 23/04; G02B 23/12; G02B 13/16; G02B 27/30
[52] U.S. Cl. .................... 359/641; 359/400; 359/407; 359/744; 359/482
[58] Field of Search ............ 359/482, 400, 407, 641, 359/663, 744, 795, 355, 375, 376, 377

[56] References Cited

U.S. PATENT DOCUMENTS

| | | | |
|---|---|---|---|
| 3,353,892 | 11/1967 | Minns et al. | 359/377 |
| 4,086,000 | 4/1978 | Cox et al. | 359/434 |
| 4,518,231 | 5/1985 | Muchel et al. | 359/377 |

FOREIGN PATENT DOCUMENTS

719076 10/1965 Canada ................ 359/400

*Primary Examiner*—Jon W. Henry
*Attorney, Agent, or Firm*—Arthur L. Plevy; Patrick M. Hogan

[57] ABSTRACT

The present invention relates to an improved collimator assembly that includes two separate optical paths. Each optical path passes through a corrector lens arrangement substantially centered and aligned with one of two eyepiece lens assemblies. Each corrector lens arrangement is constructed so as to selectively refract light passing through it, in such a manner so as to counteract and reduce the axial chromatic aberrations that occur in the eyepiece lens assemblies.

9 Claims, 10 Drawing Sheets

COLLIMATOR FOR BINOCULAR VIEWING SYSTEM

This is a division of application Ser. No. 07/811,836, filed Dec. 20, 1991 now U.S. Pat. No. 5,157,55.

FIELD OF THE INVENTION

The present invention relates to a collimator assembly for re-imaging a single source image at a substantially infinite conjugate and creating two distinct optical paths for the binocular viewing of the image through separate eyepieces. Additionally, the light passing into each eyepiece from the collimator assembly is selectively altered to counteract and reduce axial chromatic aberrations produced by the optical elements of each eyepiece.

BACKGROUND OF THE INVENTION

Many optical devices, such as some microscopes, telescopes and night vision devices, are viewed with binocular vision but have only a single objective lens arrangement. When a single source image is viewed with binocular vision, the light from the image must obviously be divided into separate corresponding optical outputs that can be viewed simultaneously. Traditionally, the division of a single source image into two corresponding binocular images has been accomplished by utilizing a collimator lens assembly. Traditionally, a collimator is an optical apparatus for producing parallel rays of light. A rudimentary form consists of a converging lens, at one focal point of which is placed a small source of light. The source of light is usually a pinhole or narrow slit from which the light is caused to emanate. Rays diverging from this focal point emerge from the objective lens in a parallel beam, in accordance to the definition of "focal point". The slit or other source, as viewed through the collimator, appear as though located at an infinite distance. The collimator lens assembly therefore re-images the source image at a substantially infinite conjugate. Consequently, the collimated light from the re-imaged source image can be split equally, without distortion or parallax, and directed into each of the eyepiece assemblies for viewing. The eyepiece assemblies are configured to receive collimated light from the collimator lens assembly and are sized and located to share lightbeam sections included within the collimator exit pupil.

Traditional collimator lens assemblies are usually formed from lenses that are symmetrically constructed about the longitudinal axis of the assembly. As such, the optical axes of the lenses, within the collimator lens assembly, are linearly aligned and rotationally symmetric about the longitudinal axis. It is well known that, in a linearly aligned, rotationally symmetric, lens arrangement, the best optical performance is usually achieved on light traveling down the optical axis of the lenses. Such an optical path is termed to be "on-axis" with the lens assembly. The optical performance of the lens assembly is reduced for light traveling "off-axis" in the field of view. The optical performance usually becomes progressively worse as light travels off-axis toward the edge of the field of view. Since many traditional collimator lens assemblies have a common optical axis for all of its component lenses, the collimator lens assembly has only one on-axis position centrally positioned within the single optical path.

Since such traditional collimator lens assemblies have only one centered pupil position, it is impossible to direct all the light passing through the center of the pupil position to both eyepieces simultaneously, when the light is split for binocular viewing. When the image produced by the collimator lens assembly is split, it is usually split evenly on either side of the center of the pupil position. Consequently, mostly decentered or "eccentric pupil" light is directed into each eyepiece and the optical performance of the collimator lens assembly may be sacrificed for the sake of performance balance with the eyepiece induced aberrations present during binocular viewing.

Figure 1:
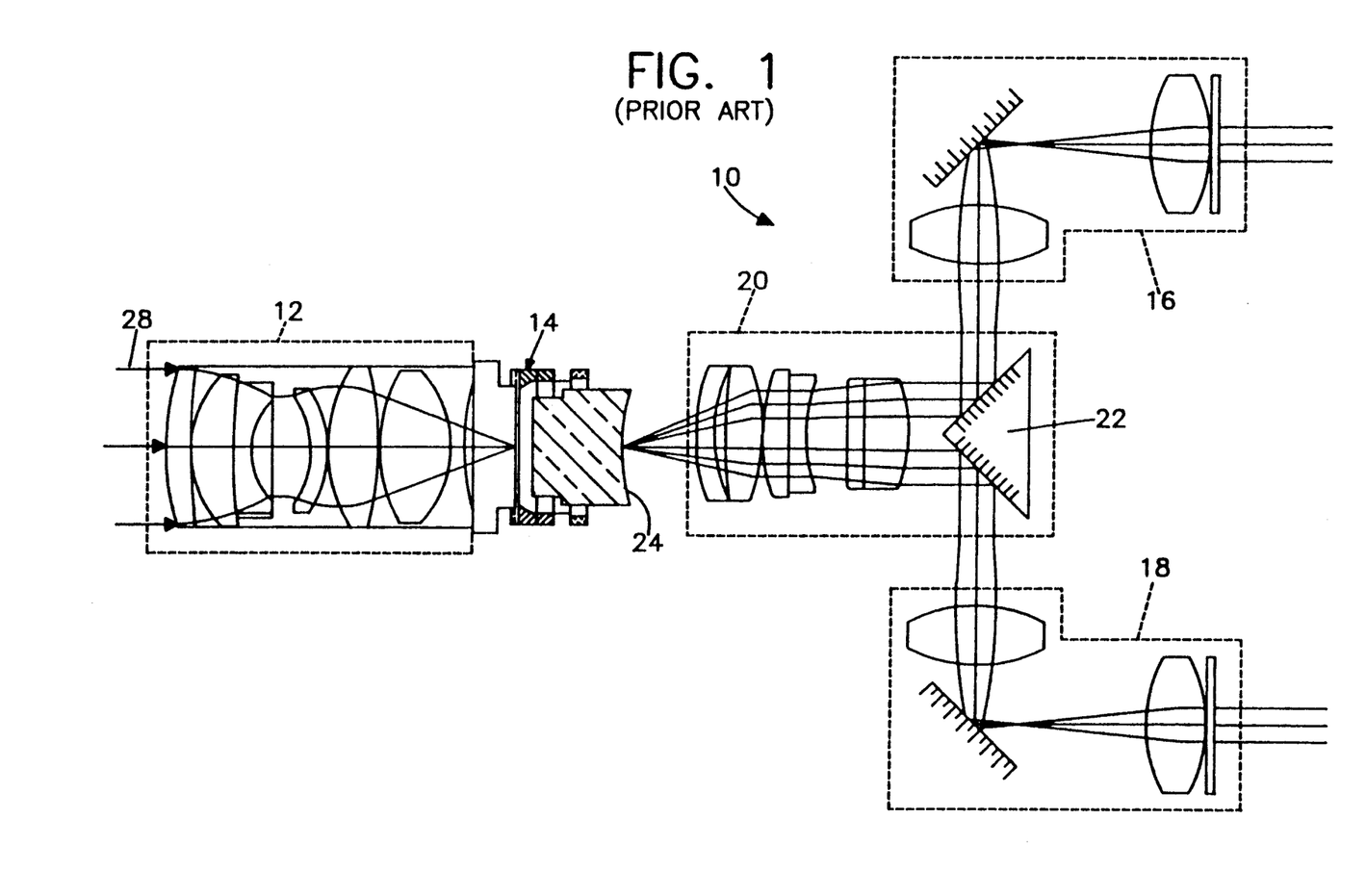
FIG. 1 is a schematic illustration of the optics for a prior art night vision goggle apparatus, "on-axis" field of view light is shown passing through the optics to facilitate consideration and discussion.

A typical prior art optical device that divides collimated light for binocular viewing is shown in FIG. 1. Other optical devices, that utilize split light from a collimator lens assembly in a decentered pupil and/or off-axis position, are exemplified in U.S. Pat. Nos. 3,781,560 to DeBurgh et al., 4,266,129 to Versteeg et al., 4,392,710 to Rogers and 4,463,252 to Brennan et al. All the above referenced patents referring to night vision optical devices.

Besides off-axis and/or decentered use of collimator lenses, single image source optical systems that employ binocular viewing have other disadvantages. Primary among the disadvantages is the formation of chromatic aberrations in the viewed image.

It is a well known phenomenon that the passage of light through an optical lens causes chromatic aberrations. Collimator lens assemblies include many different component lenses, thus many prior art collimator lens assemblies are constructed to reduce the chromatic aberrations by varying the material, shape and arrangement of each of the component lenses to compensate for the aberrations. Similarly, many multiple lensed magnifying or reducing optical assemblies also compensate for some chromatic aberrations by varying component lens construction. Prior art applications where a lens arrangement is designed to compensate for some chromatic aberrations are described in the below listed U.S. Pat. Nos.:

| | |
|---|---|
| 5,011,272 to Nakayama et al. | 4,397,520 to Neil |
| 4,963,010 to Kikuchi | 4,365,871 to Muchel |
| 4,871,219 to Cooper | 4,171,872 to Baker |
| 4,641,927 to Prescott et al. | 3,827,785 to Matsusbita et al. |
| 4,435,041 to Torok et al. | 3,637,295 to Matsumura et al. |
| 4,411,488 to Neil | 3,604,786 to Baker |

However, the lenses forming the collimator lens assembly are not the only optical elements in the system that can cause chromatic aberrations. In binocular viewing two eyepiece lens assemblies are used; one for each eye. The eyepiece assemblies may have lenses to magnify an image or a simple lens arrangement to invert a previous inverted image for normal viewing. Often the chromatic aberrations of the eyepiece optics is not fully corrected; thus reducing the quality of the image viewed. In prior art applications the axial chromatic aberrations are often ignored as being insignificant or too difficult to correct with cost effective lenses. In classical aberration theory there exists a conventional aberration limitation to lens design performance called "axial chromatic aberration" or "axial color". This is defined as the degree to which red, green and blue light, or other long, nominal and short wavelengths, are focused at different locations along the optical axis. In applications such as night vision optics, the viewed image may be within a more restrictive wavelength range than blue to red light, but still may produce substantial chromatic aberrations that can cause a large reduction in the quality of the viewed image.

It is therefore a primary objective of the present invention to provide an optical assembly wherein a single image source is directed to two eyepieces for binocular viewing such that each eyepiece receives light from a decentered section of the exit pupil of a collimator assembly.

It is a further object of the present invention to provide a collimator assembly that corrects the image to compensate for, and reduce, axial chromatic aberrations that will undesirably distort the image due to optical elements of the eyepieces through which the image is viewed.

SUMMARY OF THE INVENTION

The present invention is a collimator assembly for re-imaging a single source image at a substantially infinite conjugate so that the image can be viewed with binocular vision. The present invention includes focussing lens elements in combination with a decentered corrector lens assembly, such that two unique optical paths are provided; one for each eyepiece assembly. Each of the optical paths is aligned with one of the two eyepiece assemblies used for the binocular viewing. Additionally, the dual corrector lens assembly is positioned such that the primary waves of light, traveling along each optical path in the collimator assembly, passes through the optics of the dual corrector lens assembly in a substantially centered position with respect to the axis of symmetry of the eyepiece assembly.

The dual corrector lens assembly includes two corrector lens arrangements oriented adjacent to one another. Each corrector lens arrangement is formed to be substantially afocal to light in the mid-region of the spectral range being used. The corrector lenses are not afocal to the wavelengths of light above and below the mid-region. Rather, the corrector lens arrangements refract the light in such a manner to compensate for the axial chromatic aberrations that are produced by the optical components of the eyepiece assemblies. By correcting light for axial chromatic aberration, this aberration is substantially reduced across the entire field of view.

The correction of axial chromatic aberrations, in conjunction with the centered use of the corrector lens arrangements, result in a viewed image that has less distortion and is of higher quality than is provided by the prior art.

BRIEF DESCRIPTION OF THE DRAWINGS

For a better understanding of the present invention, reference is made to the following description of an exemplary embodiment thereof, considered in conjunction with the accompanying drawings, in which:

FIG. 6b is a graph illustrating the axial chromatic aberrations manifested by the prior art eyepiece lens assembly of FIG. 6a;

FIG. 8a is a schematic illustration of the optics of the present invention corrector lens arrangement of FIG. 7 in conjunction with the prior art eyepiece assembly of FIG. 6a; and FIG. 8b is a graph illustrating the axial chromatic aberrations manifested by the optics of FIG. 8a.

DETAILED DESCRIPTION OF THE DRAWINGS

Referring to FIG. 1 there is shown a schematic diagram of the optics for the Model AN/PVS-7B night vision goggles apparatus 10 sold by International Telephone and Telegraph, Inc., the assignee herein. The shown night vision apparatus 10 works by accepting visible and infrared, or near infrared light, through an objective lens assembly 12 and focusing that light onto an image intensifier tube assembly 14. The image intensifier tube 14 converts the input light to a visible image that can be viewed by an observer through the eyepiece assemblies 16, 18. In night vision applications the devices provide an image utilizing a relatively narrow spectral range of light wavelengths.

The shown night vision apparatus 10 has only one objective lens assembly 12, yet the image produced is viewed through two eyepiece assemblies 16, 18, one for each eye of the observer. As such, it is necessary to re-image the output image of the image intensifier tube 14 in a manner such that two output images are created, and binocular vision may be employed.

In the shown prior art system, two output images are created by the use of a collimator assembly 20 that includes a bifurcating mirror 22. The optics of the collimator assembly 20 uses the output surface 24 of the image intensifier tube assembly 14 as its object, and re-images the output surface 24 at infinity in order to present an infinity conjugate object to the eyepiece assemblies 16, 18. By re-imaging the output surface 24 of the image intensifier tube assembly 14 to an infinity conjugate, the collimated light exiting the collimator assembly 20 may be split into two images (one ultimately for each eye) by the "bifurcating" mirror 22. The "bifurcating" mirror 22 reflects light from only half of the optics of the collimator assembly 20 (collimator lens output pupil) into each eyepiece assembly 16, 18. Since the output surface 24 of the image intensifier tube 14 is re-imaged at infinity, binocular vision is easily utilized by a simple splitting of the collimated light and directing the light to separate eyepiece assemblies 16, 18. To avoid vignetting of light from the periphery of the intensifier tube face, it is necessary to place the bifurcating mirror 22 in close proximity to the output surface of collimator lenses (collimator output pupil)

and the image of the eyepiece assembly pupil ("matched pupils"). Thus, the vignetting of light is also reduced by placing each eyepiece assembly 16, 18 in close proximity to the bifurcating mirror 22. The mirror must be equal to or larger in size than the eyepiece pupil.

In the prior art embodiment of FIG. 1, light rays 28 are shown entering the objective lens assembly 12, parallel to the longitudinal axis of the system. Such incoming light produces an output image from the center of the image intensifier tube assembly 14 that is "on-axis" with the optical axis of the collimator assembly 20. However, in real use, nasal and temporal light enters the objective lens assembly 12 at varying angles to the longitudinal axis of the system. Such angled light produces "off-axis" images from the image intensifier tube assembly 14.

Figure 2:
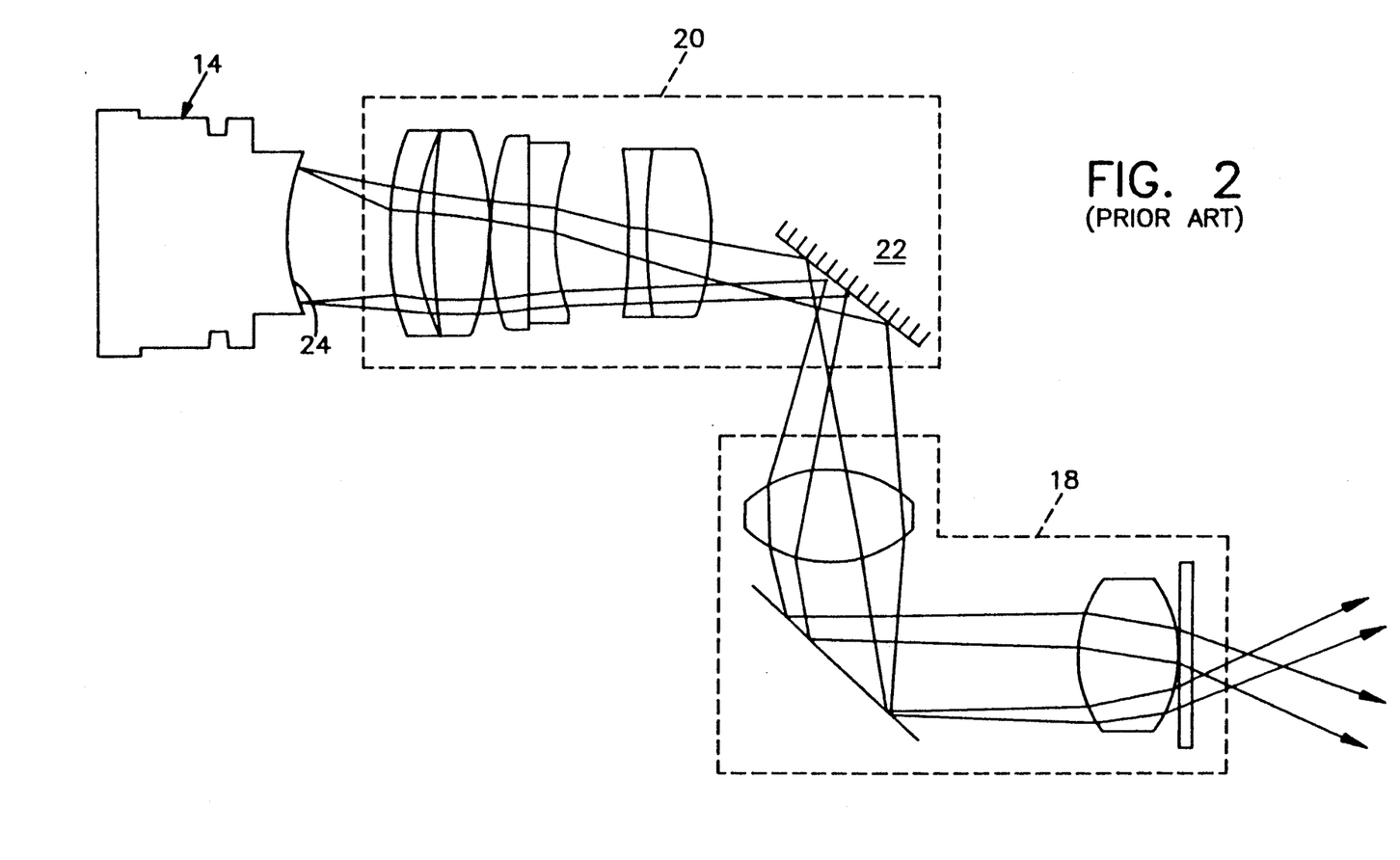
FIG. 2 is a schematic illustration of a section of the prior art optics shown in FIG. 1, the illustration shows nasal and temporal "off-axis" field of view light passing through the shown optical element.

Referring to FIG. 2 there is shown off-axis light produced by the image intensifier tube assembly 14 that passes through the collimator assembly 20 and into one eyepiece assembly 18.

The collimator assembly 20 of the prior art device has each of its optic lenses symmetrically formed around a common longitudinal axis. Consequently, each of the lens elements in the collimator assembly 20 share a common optical axis. It is well known in the art of optics that in such symmetric optical configurations, the optical performance of the system is best along the on-axis optical path of the system. The optical performance becomes progressively worse as off-axis light moves toward the peripheral edges of the field of view. As can be seen in FIGS. 1 and 2, the collimator assembly 20 is not used in an on-axis application. The collimator assembly 20 is used to form two collimated images through the bifurcating mirror 22. The optical path for each of the images passes through the collimator lens assembly 20 at decentered positions. In fact, the center of each reflective surface of the bifurcating mirror 22 and the optical paths of each eyepiece assembly 16, 18 are both aligned in an decentered position with respect to the exit pupil of the collimator lens assembly 20. The optical path of each eyepiece assembly 16, 18 is aligned with a decentered position on the collimator assembly 20 that is substantially midway between the on-axis and the peripheral edge of the exit pupil of the collimator assembly 20.

The present invention can be used in many different applications where a single source image is viewed with binocular vision or where chromatic aberrations are created by eyepiece assemblies. However, the present invention is especially suitable for use in connection with night vision devices. Accordingly, the present invention will be described in connection with improving the previously described prior art Model AN/PVS-7B night vision goggles.

Figure 3:
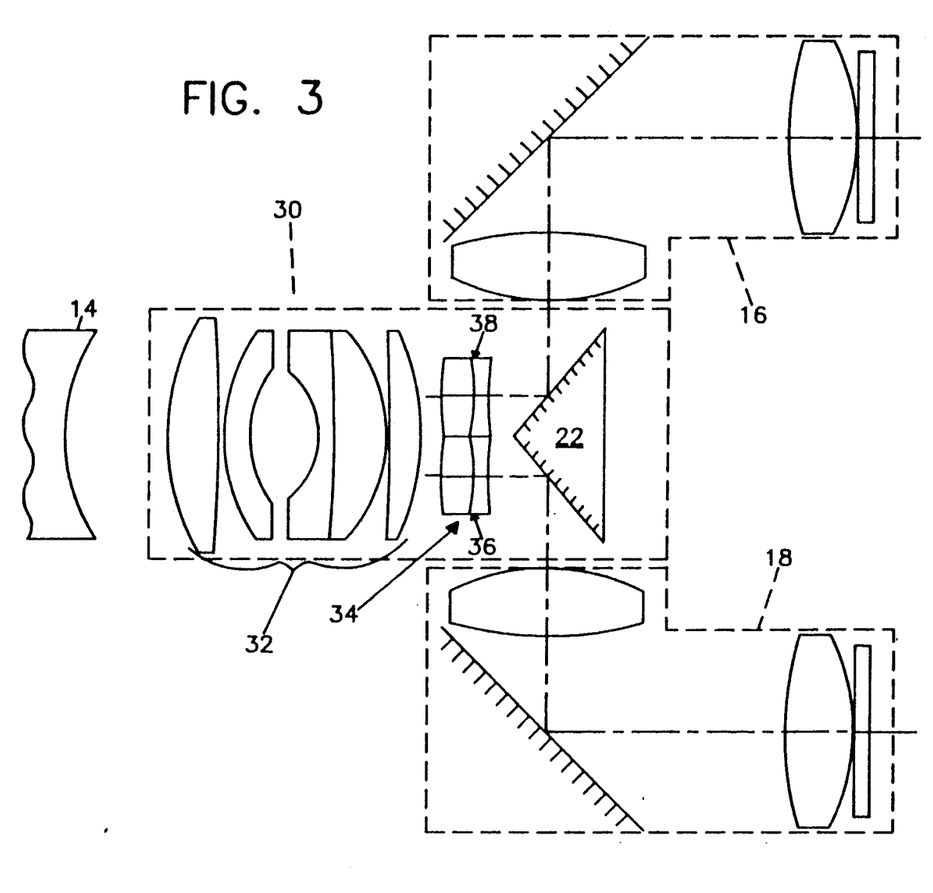
FIG. 3 is a schematic illustration of one preferred embodiment of the present invention optic assembly incorporated into a night vision goggle apparatus.

Referring to FIG. 3, the present invention collimator assembly 30 is shown incorporated into the previously depicted Model AN/PVS-713 night vision goggle system. The present invention collimator assembly 30 includes focus optics 32, a dual decentered corrector lens assembly 34 and a bifurcating mirror 22. The dual decentered corrector lens assembly 34 is preferably constructed from two distinct corrector lens arrangements 36, 38 that are adjacent to one another. Each of the corrector lens arrangements 36, 38 are positioned such that the on-axis position of each corrector lens assembly 36, 38 is substantially aligned with the central optic path of the two eyepiece assemblies 16, 18, respectively. The presence of the dual decentered corrector lens assembly 34 creates two separate optical paths for light transversing the collimator assembly 30.

Figure 4:
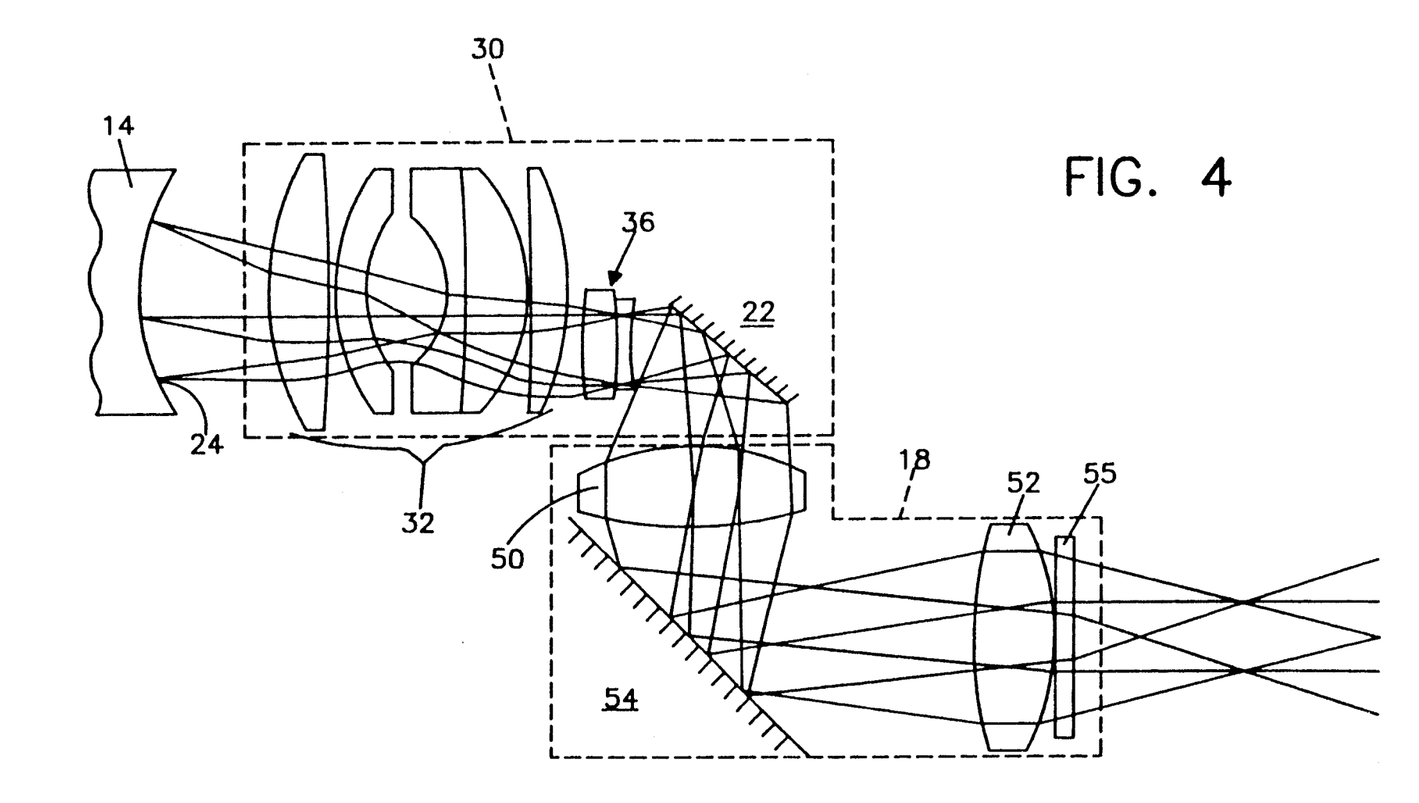
FIG. 4 is a schematic illustration of a section of the optical assembly of FIG. 4, the illustration shows on-axis and off-axis, nasal and temporal light passing through the shown optical element.

In FIG. 4, the present invention corrector assembly 30 is shown focusing both on-axis and off-axis light produced by the image intensifier tube assembly 14. As can be seen, both on-axis and off-axis light from the entire output surface 24 of the image intensifier tube assembly 14 is directed into each corrector lens arrangement 36, 38. Since corrector lens arrangements 36, 38 are positioned to be substantially centered in the pupil of the eyepiece assemblies 16, 18, a larger amount of peripheral light from the image intensifier tube 14 can be focused without significant vignetting. The corrector lens arrangements 36, 38 are formed to be essentially afocal, compared to the power of the focus optics 32, thus the telecentricity of the optical path can be preserved as the image light passes into each eyepiece assembly 16, 8.

The specific construction of the preferred embodiment of the focus optics 22 of the present invention collimator assembly 30 is described by referring to FIG. 5 in combination with the below referenced table. As can be seen, the focus optics 22 are constructed from five separate lens elements. The lens elements including a biconvex lens 40, a meniscus lens 42, a first doublet lens 44, a second doublet lens 46 and a plano-convex lens 48. The optical material comprising each lens element is expressed as follows:

| Lens Reference No. | vd | nd |
| --- | --- | --- |
| 40 | 40.8 | 1.8830 |
| 42 | 23.8 | 1.8466 |
| 44 | 25.4 | 1.8052 |
| 46 | 47.5 | 1.7883 |
| 48 | 40.8 | 1.8830 |

Figure 5:
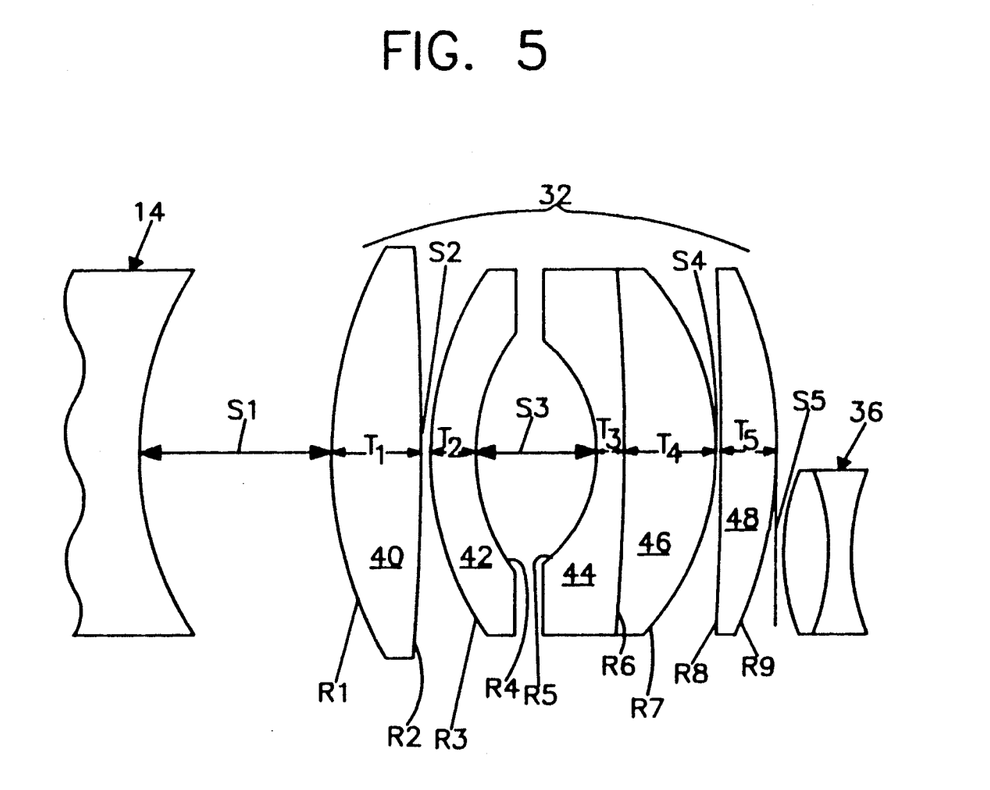
FIG. 5 is a side view showing the construction and arrangement of the present invention collimator assembly, with only one of the dual decentered corrector lens arrangements.

In referencing FIG. 5, the physical parameters of each lens element is shown along with the overall arrangement of the focus optics 32, where:

| Lens Surface Curvature | Lens Spacing | Lens Thickness |
| --- | --- | --- |
| R1 = 28.118 mm | S1 = 10.84 mm | T1 = 4.00 mm |
| R2 = 141.890 mm | S2 = 0.358 mm | T2 = 1.96 mm |
| R3 = 12.647 mm | S3 = 6.282 mm | T3 = 1.50 mm |
| R4 = 09.650 mm | S4 = 0.200 mm | T4 = 4.95 mm |
| R5 = 08.970 mm | | T5 = 2.86 mm |
| R6 = 62.935 mm | | |
| R7 = 14.000 mm | | |
| R8 = 111.340 mm | | |
| R9 = 21.800 mm | | |

Figure 6A:
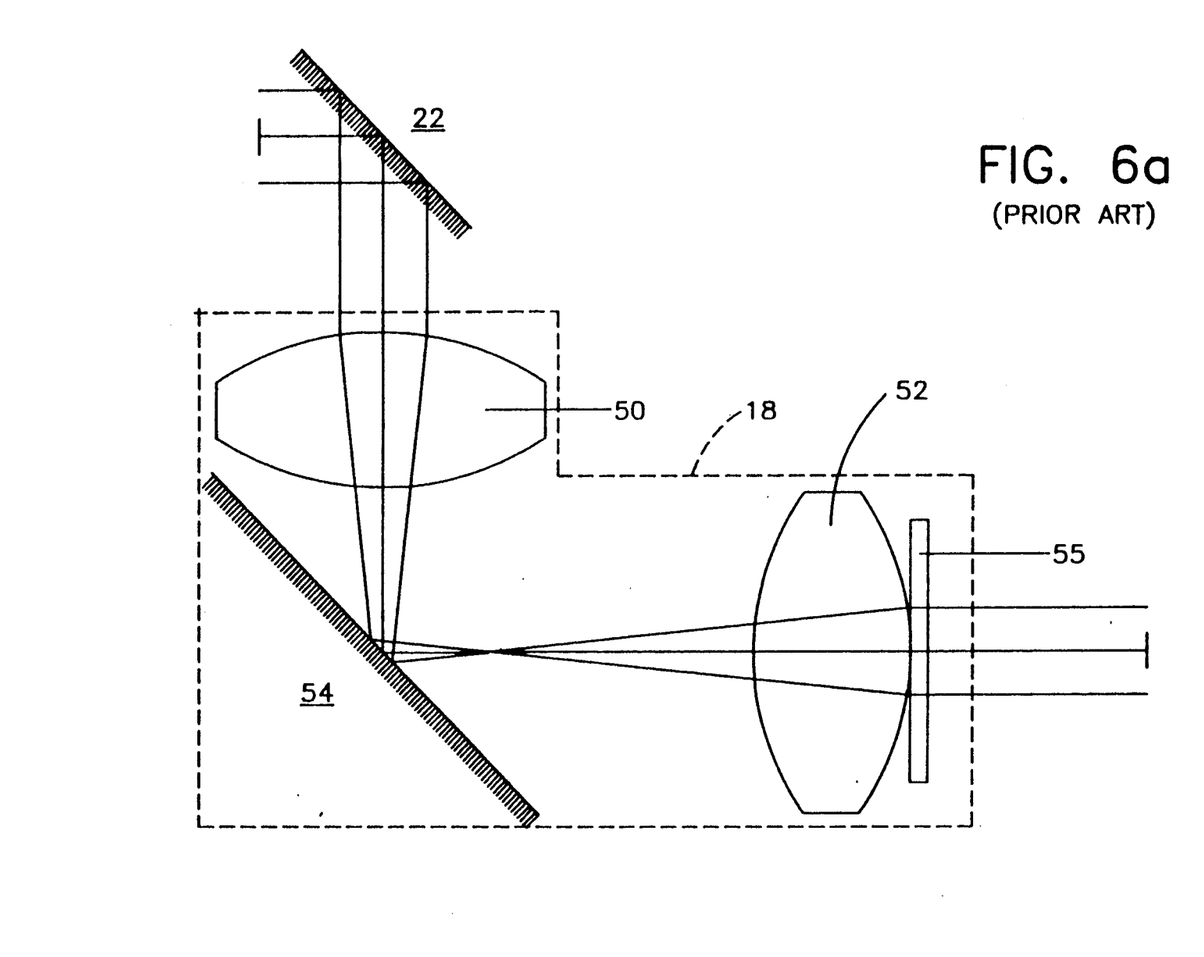
FIG. 6a is a schematic illustration of one eyepiece lens assembly from the prior art night vision goggle apparatus shown in FIGS. 1 and 2.

Referring to FIG. 6a there is shown a single prior art eyepiece assembly 18 used in one configuration of PVS-7B goggle. The eyepiece assembly includes two identically formed aspheric lenses 50, 52 of like material as molded plastic. The eyepiece assembly 18 receives uncorrected light reflected from the bifurcating mirror 22. The light passes through the first aspheric lens 50, is reflected off a fold mirror 54, and through the second aspheric lens 52. The image is then viewed by an observer through a protective window 54. In the preferred embodiment, the aspheric lenses 50, 52 are used to invert the image reflected off the bifurcating mirror 22, and are arranged in relation to one another to have no optical power. The aspheric lenses 50, 52 are preferably constructed of inexpensive material such as plastic. Such a lens form is lighter in weight and less costly than other possible lens forms; thus making such a construction highly desirable. However, the molding of identical aspheric lenses from similar material does have disadvantages. Notable among the disadvantages is the impossibility of removing axial chromatic aberrations. Identical lenses made from one material have only one dispersion property. As such, the aspheric lenses 50, 52 have no capacity to balance each other's chromatic aberrations. As a consequence, eyepiece assemblies utilizing the aspheric lenses 50, 52 will introduce chromatic distortion to the optical system that adversely affects the quality of the viewed image.

Light passing through the eyepiece assembly 18 includes all the wavelengths from a desired spectral range. It is well known that for each wavelength passing through a biconvex lens, a distinct focal point will be formed. For purposes of this description, the wavelength of light in the mid-region of a given spectral range is considered the nominal wavelength. The nominal light wavelength will thus focus at a single nominal focal point. This nominal focal point can be used as a reference point to measure the distortion of other light wavelengths that are above or below the nominal light wavelength. When plotted on a graph, the distance of the focus point of non-nominal light wavelengths can be plotted against the nominal focal point on an x-y grid across the field of view. Consequently, the focus point of non-nominal light wavelengths can be compared to the nominal focal point by an x and y coordinate.

Figure 6B:
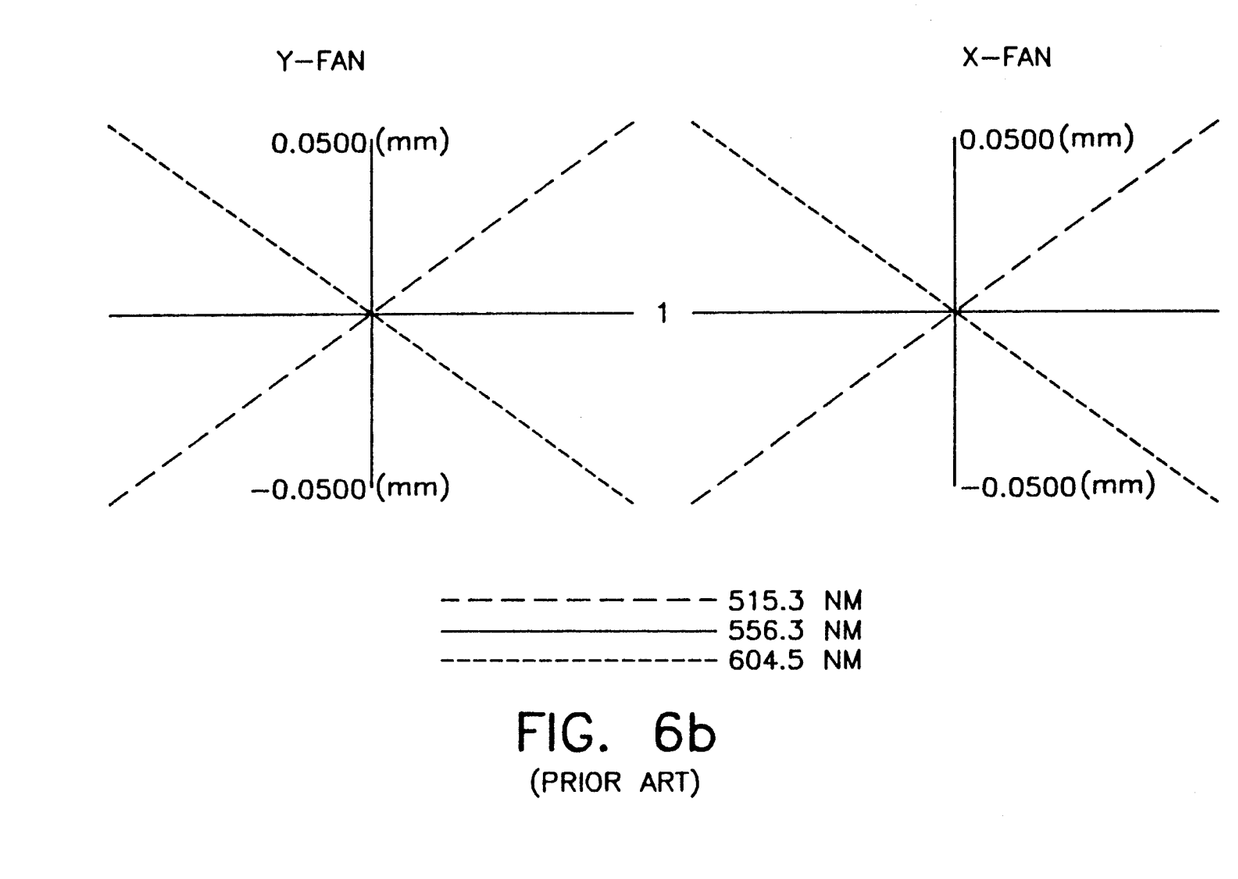

Referring to FIG. 6b there is shown graphs representing the varying color aberrations in the prior art eyepiece assembly 18 (shown in FIG. 6a). Two graphs are shown for light having a nominal wavelength of 556.3 nm, and have non-nominal wavelengths of 515.3 nm and 604.5 nm. The first graph shows the "Y-fan" of the color aberrations. The Y-fan shows the traverse position of the focal points for the various wavelengths, across the pupil diameter in the Y-axis. Similarly, the second graph shows the traverse position of the focal points for various wavelengths, across the pupil diameter in the X-axis. As can be clearly seen, wavelengths both higher and lower than the nominal wavelength have significantly differing focal points and thus can cause severe axial chromatic aberrations when viewed by an observer.

As has been previously discussed, a dual decentered corrector lens assembly 32 is formed as part of the present invention collimator assembly 30 to create two distinct optical paths; one for each eye of the observer (see FIG. 3). The dual decentered corrector lens assembly 34 is comprised of two laterally adjacent corrector lens arrangements 36, 38. The corrector lens arrangements 36, 38 can be constructed so as to selectively refract the light passing through them, and counteract the axial chromatic aberration that will occur in the light as the light passes through the eyepiece assemblies 16, 18.

Figure 7:
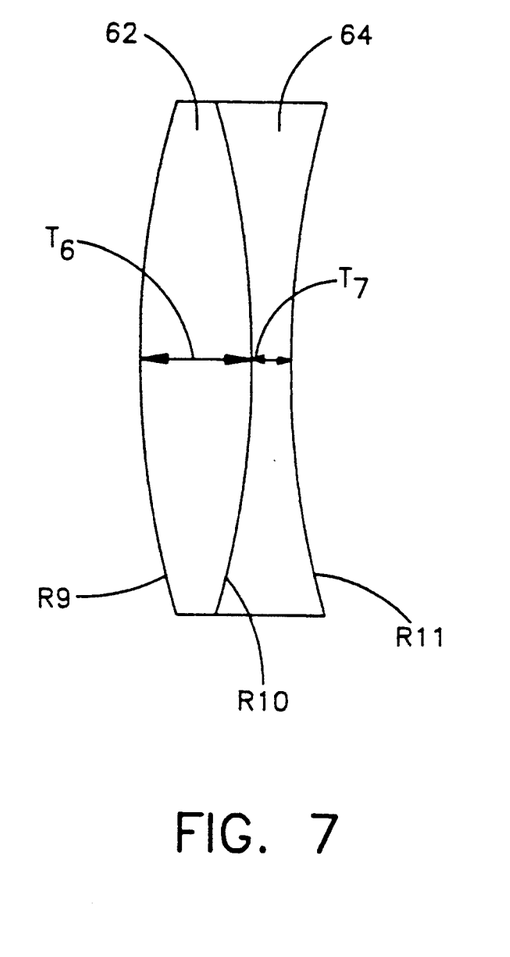
FIG. 7 is a side view of one embodiment of the present invention corrector lens arrangement.

In FIG. 7 there is shown a cross-sectioned side view of one corrector lens arrangement 36. The corrector lens arrangement 36 shown is a doublet and is formed to be essentially zero power to monochromatic light in the mid-region of a desired spectral region. In such a construction, the wavelengths of the mid-region of the desired spectral region would enter and exit the corrective lens arrangement 36 along substantially parallel paths. However, wavelengths that are shorter or longer than the mid-region wavelength will be refracted to counteract the axial chromatic aberration that will occur in the eyepiece assemblies (see FIG. 6b). For example, suppose the light passing through the corrector lens arrangement 36 were visible light, the corrector lens arrangement 36 would be substantially zero power, compared to the focal optics 32, for light near the green wavelengths and refract light toward the red and blue wavelengths.

The corrector lens arrangement 36 can be comprised of any plurality of optical elements that combine to have the above-mentioned properties. However, the preferred embodiment is a doublet comprised of a biconvex lens 62 bonded to a biconcave lens 64. The physical parameters for the biconvex lens 62 and biconcave lens 64 are shown by referencing FIG. 7 in view of the following table:

| Lens | Vd | Nd | Radius of Surface (mm) R9 | R10 | R11 | Midwidth (mm) T(x) |
|---|---|---|---|---|---|---|
| Biconvex | 40.8 | 1.8830 | 29.950 | 28.118 | — | 2.92 |
| Biconcave | 23.8 | 1.8466 | — | 28.118 | 29.950 | 1.24 |

The biconvex lens 62 and biconcave lens 64 are joined on surface R10 by an optical cement or other means known in the art. The point of the corrective lens arrangement closest the end lens 48 of the focus optics 32 is separated by a space S5 of 2.28 mm.

Figure 8A:
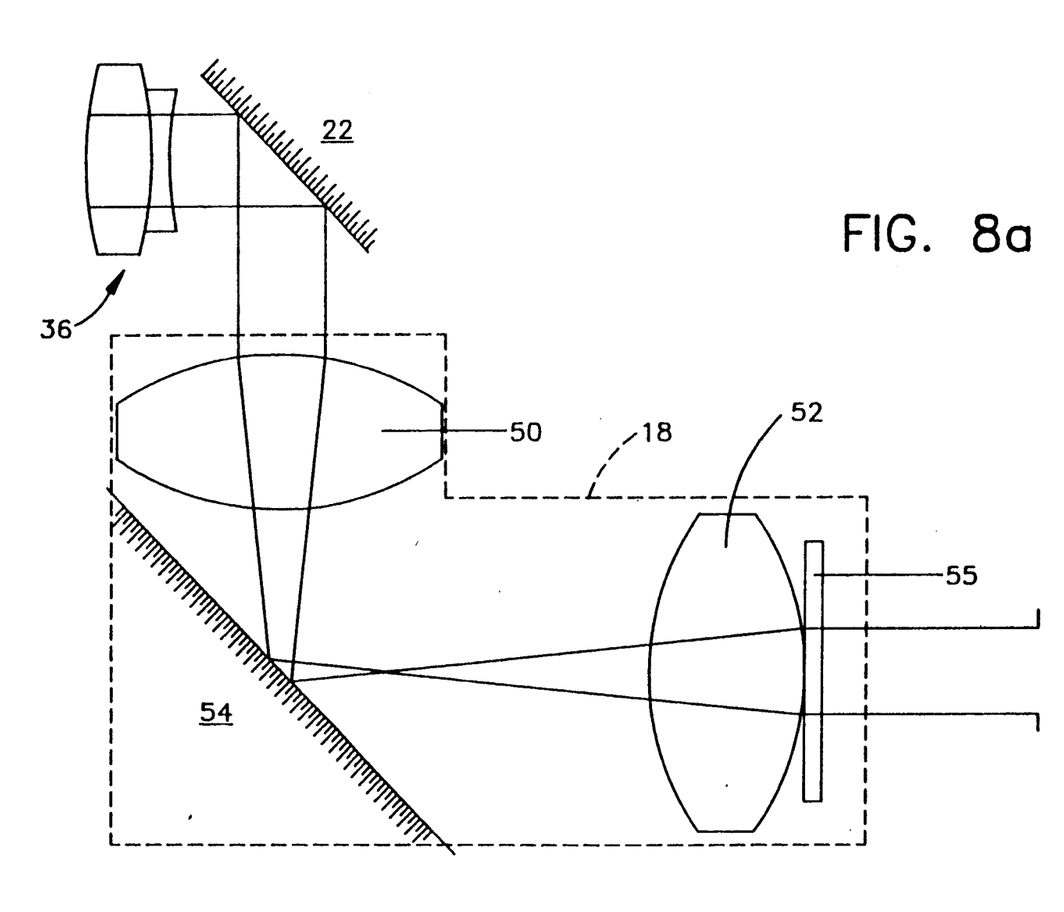
Figure 8B:
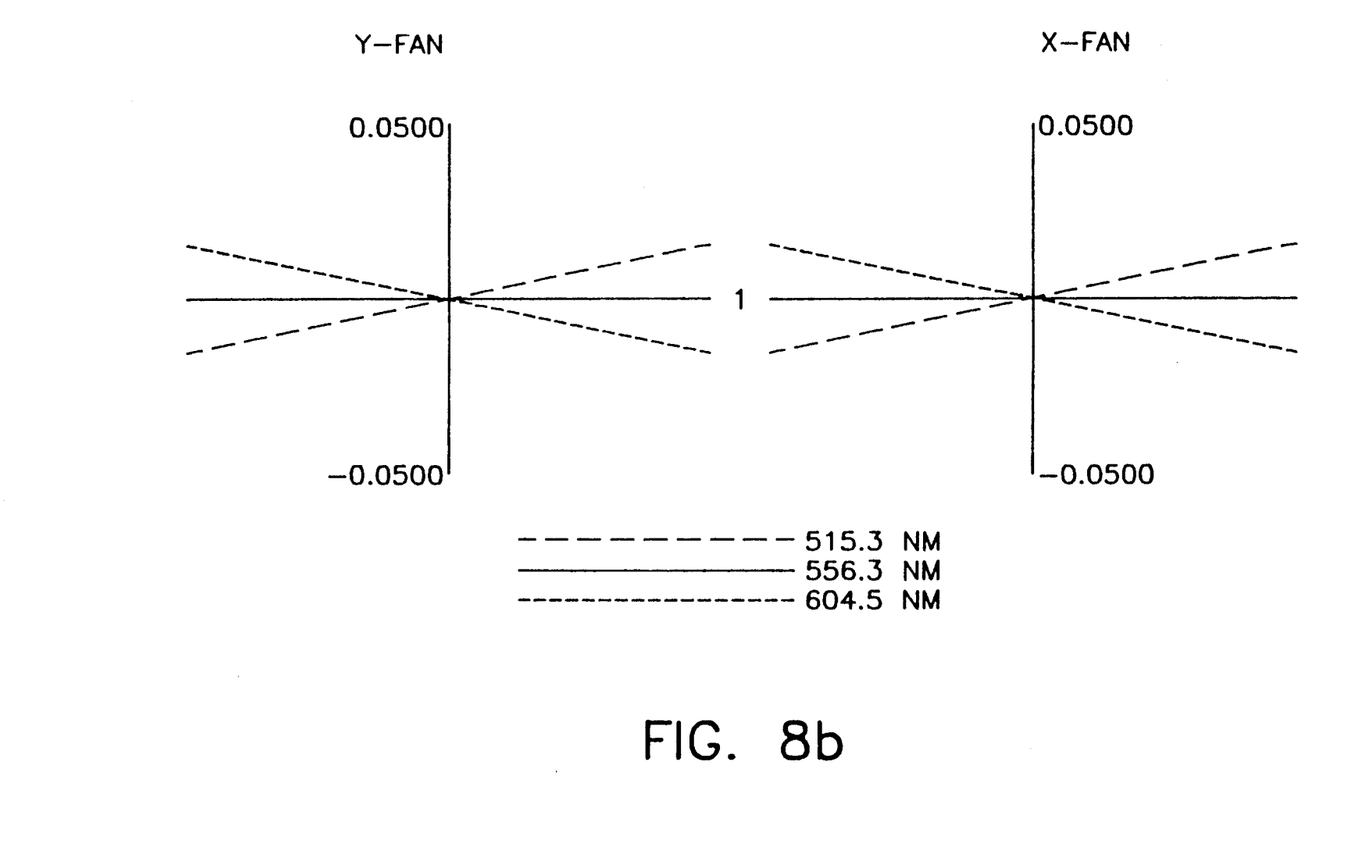

In FIG. 8a there is shown the eyepiece assembly 18 of FIG. 6a receiving chromatically adjusted light from through a corrector lens arrangement 36. As has been described, the corrector lens arrangement 36 is substantially afocal for wavelengths in the mid-region of a given spectral range. However, wavelengths above and below the mid-region wavelengths are refracted to compensate for the chromatic aberrations that will occur in the eyepiece assembly 18. Referring to FIG. 8b, the Y-fan and X-fan graphs of the corrected light passing through the eyepiece assembly 18 is shown for the three wavelengths previously used in FIG. 6b. When the corrected wavelengths of FIG. 8b are compared to the uncorrected wavelengths of FIG. 6b, it is easily seen that the amount of axial chromatic aberration is reduced.

Referring back to FIGS. 3-4, it should now be understood that the present invention collimator assembly 30 includes two corrector lens arrangements 36, 38, laterally positioned in a dual decentered corrector lens assembly 34. The two corrector lens arrangements 36, 38 serve to create two distinct decentered optical pathways within the collimator assembly 30, and correct light, centered in the pupil of the eyepiece assemblies 16, 18, for the axial chromatic aberrations. Although the dual optical pathway of the present invention does improve off-axis light performance, as compared to prior art, it obviously does not eliminate off-axis light aberrations completely. Off-axis light causes axial chromatic aberration at essentially all off-axis locations in a lens assembly. However, if the lens assembly is substantially telecentric, (i.e., the chief rays are nearly parallel and nearly parallel to the optical axis of the assembly), then the variation of off-axis chromatic aberration effects of axial color are minimized and the axial color is essentially constant over the field of view. In the shown embodiment, the corrector lens arrangements 36, 38 are placed at the rear of a collimator assembly 30. The corrector lens arrangements thus receive light from a substantially telecentric optical system. Since the off-axis light is not present to create lateral chromatic aberrations, there is very little lateral disturbance to axial aberrations. Consequently, the corrector lens arrangements 36, 38 positioned near the pupil of the eyepiece assemblies 16, 18, will correct the axial color aberrations substantially equal over the entire field of view when viewed through the eyepiece assemblies 16, 18.

As has been described, the present invention need not be limited to night vision apparatuses, but may be utilized in any application when a single source image is viewed with binocular vision or chromatic aberrations exist in an eyepiece lens assembly. However, it should also be obvious to a person skilled in the art that the present invention can be used to improve any single source/dual optical output system, such as for simultaneous viewing and photography. The present invention can also be used in laser systems where one optical path is used to inject a laser, while the other optical path is used for viewing the effects of the laser in real time. These laser applications could include surgery and manufacturing processes such as cutting and welding.

It will be understood that the embodiment described herein is merely exemplary and that a person skilled in the art may make variations and modifications without departing from the spirit and scope of the invention. More specifically, it should be understood that the present invention is addressed to the overall performance characteristics of the described optical elements, and that any single optical element described may be replaced with a varied optical assembly, as long as the optical performance remains as described. All such variations and modifications are intended to be included within the scope of the invention as defined in the appended claims.

What is claimed is:

1. In an optical device having a single source image viewed, with binocular vision, from a first and second eyepiece assembly, a collimator assembly comprising:

a focusing lens assembly for re-imaging said source image at a substantially infinite conjugate; and a dual decentered corrector lens assembly for creating two optical paths in said collimator assembly, each said optical path being substantially optically aligned with an associated eyepiece assembly, wherein said corrector lens assembly includes at least one optical element along each of said optical paths that is substantially afocal to wavelengths in a mid-region of a desired spectral region and refracts wavelengths outside said mid-region to reduce axial chromatic aberrations in each said eyepiece assembly.

2. The collimator assembly of claim 1, wherein said dual decentered corrector lens assembly includes two corrector lens arrangements, each said corrector lens arrangement having an optical axis substantially aligned with the optical axis of one said eyepiece assembly.

3. The collimator assembly of claim 2, wherein said focusing lens assembly directs substantially the whole source image to each said corrector lens arrangement.

4. The collimator assembly of claim 1, wherein said at least one optical element includes a doublet.

5. The collimator assembly of claim 3, further including a bifurcating mirror for directing the passing through each said corrective lens arrangement into each said eyepiece assembly.

6. The collimator assembly of claim 4, wherein said doublet includes two lenses element of dissimilar refractive properties.

7. The collimator assembly of claim 6, wherein said doublet includes a biconcave lens and a biconvex lens.

8. The collimator assembly of claim 1, wherein said mid-region of said spectral range is between the frequencies of 515 nm and 604 nm.

9. The collimator assembly of claim 6, wherein each said doublet has no appreciable optical power.

* * * * *